Patented Apr. 5, 1949

2,466,232

UNITED STATES PATENT OFFICE 2,466,232

SYNTHESIS OF BIOTIN INTERMEDIATES

Stanton A. Harris, Westfield, and Dorothea Heyl, Rahway, N. J., assignors to Merck & Co., Inc., Rahway, N. J., a corporation of New Jersey No Drawing. Application September 16, 1944, Serial No. 554,458

4 Claims. (Cl. 260—470)

This invention is concerned generally with novel chemical compounds and processes of preparing the same; more particularly it relates to novel compounds useful as intermediates in synthesis of the growth-promoting factor, biotin.

Biotin is known to be one of the isomers of the chemical compound 2-(4'-carboxy-butyl)-3:4-ureido-tetrahydrothiophene, having the empirical formula $C_{10}H_{16}O_3N_2S$, and the structural formula:

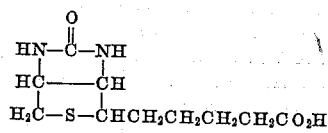

It is now found that this compound can be synthesized by reactions indicated as follows:

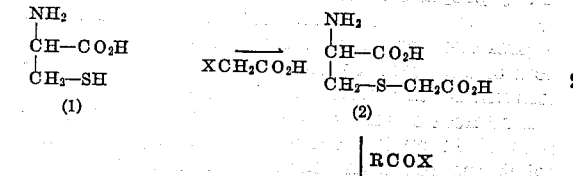

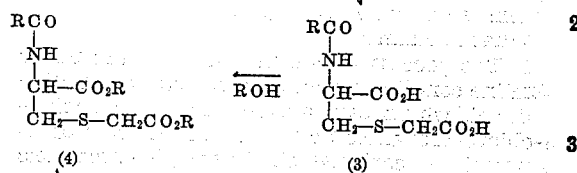

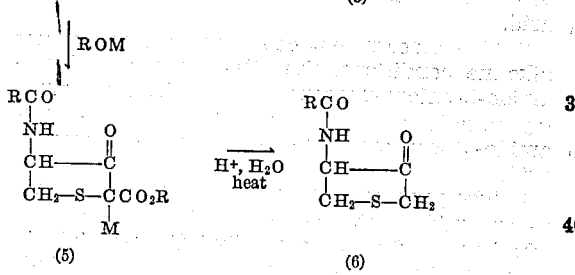

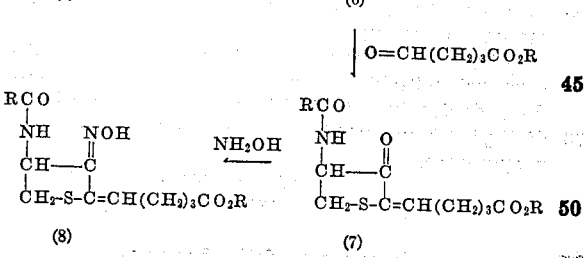

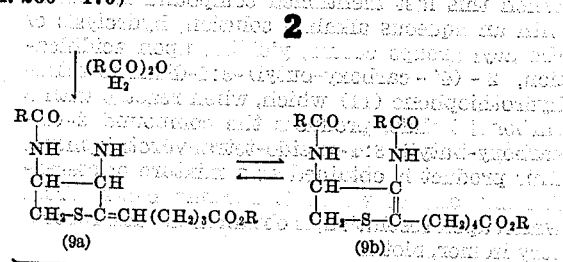

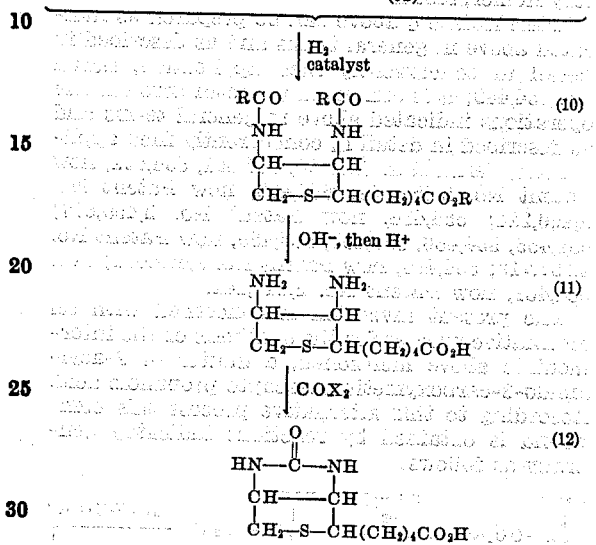

In the above formulae, R represents an alkyl, aryl or arylalkyl group; X, a halogen; and M an alkali metal or an alkaline earth metal.

The reactions above indicated are conducted as follows: 2-amino-3-mercapto-propanoic acid (1) and chloroethanoic acid are condensed in an alkaline aqueous solution to form 2-amino-3-carboxymethylmercapto-propanoic acid (2); which is then treated with an acylating agent, such as an acyl halide, in an aqueous alkaline solution to yield 2-acylamido-3-carboxymethyl-mercapto-propanoic acid (3). This product is esterified using a mineral acid catalyst, to produce the diester (4) of the acid (3), and the diester is treated with alkali metal alcoholate or an alkaline earth metal alcoholate to yield the 2-alkali metal or the 2-alkaline earth metal derivative of an ester of 2-carboxy-3-keto-4-acylamido-tetrahydrothiophene (5). This compound, when heated with a dilute mineral acid, is hydrolyzed and decarboxylated to produce 3-keto-4-acylamido-tetrahydrothiophene (6) which, when reacted with 4-carboxy-butanal ester in a lower aliphatic alcohol reaction medium containing piperidine and a lower aliphatic carboxylic acid, produces 2-(4'-carboalkoxy-butylidene)-3-keto-4-acylamido-tetrahydrothiophene (7). This product, when reacted with hydroxylamine yields an ester of the corresponding oxime, 2-(4'-carboxy-butylidene)-3-isonitroso-4-acylamido-tetrahydrothiophene (8) which upon treatment with a mixture of zinc, a lower aliphatic acid and a lower aliphatic acid anhydride, produces an equilibrium mixture of 2-(4'-carboxy-butylidene)-3:4-di(acylamido)-tetrahydrothiophene ester (9a) and 2-(4'carboxy-butyl)-3:4-di(acylamido)-4:5-dihydrothiophene ester (9b). This equilibrium mixture, or if preferred, one of the equilibrants, is then treated with hydrogen in the presence of a hydrogenation catalyst to yield 2-(4'-carboxy-butyl)-3:4-di(acylamido)-tetrahydrothiophene ester (10). When this last mentioned compound is treated with an aqueous alkaline solution, hydrolysis of the acyl groups occurs, yielding upon acidification, 2-(4'-carboxy-butyl)-3:4-diamino-tetrahydrothiophene (11) which, when reacted with a carbonyl halide, produces the compound 2-(4'-carboxy-butyl)-3:4-ureido-tetrahydrothiophene. This product is obtained as a mixture of stereoisomers, one of which is racemic biotin, from which upon resolution, is obtained the dextrorotatory isomer, biotin.

Intermediate 4 above can be prepared as indicated above in general terms and as described in detail in concurrently filed application, Serial No. 554,449; it is converted to biotin through the operations indicated above in general terms and as described in detail in concurrently filed applications, Serial Nos. 554,450, 554,451, 554,452, now Patent No. 2,452,653; 554,453, now Patent No. 2,460,224; 554,454, now Patent No. 2,459,817; 554,455, 554,456, 554,457, 554,459, now Patent No. 2,437,719; 554,460, now Patent No. 2,442,681; and 554,461, now Patent No. 2,441,141.

The present invention is concerned with an alternative process for the synthesis of the intermediate above mentioned, a diester of 2-acylamido-3-carboxymethylmercapto propanoic acid. According to this alternative process this compound is obtained by reactions indicated generally as follows:

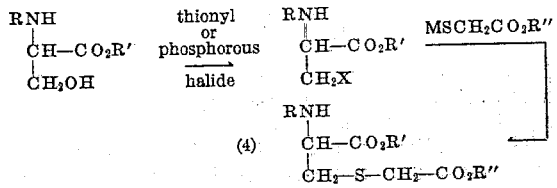

wherein R is an acyl group, R' and R'' are of the class consisting of alkyl, aryl and arylalkyl, X is a halogen and M is an alkali metal.

Inasmuch as the reactions according to this invention do not involve the acyl group (R) or the ester groups ($-CO_2R'$ and $-COR''$) it will be apparent to those versed in this field of invention that within the limitations set forth above these radicals can be varied without effect upon the process. For example, R can be acetyl, propionyl or benzoyl; R' and/or R'' can be methyl, ethyl, propyl, butyl, benzyl or the like. Thionyl or phosphorous chlorides and bromides being most readily available, it is preferred that X be Cl or Br, and for similar reasons, that M be Na or K.

The following example illustrates a method of carrying out the present invention, but it is to be understood that this example is given by way of illustration and not of limitation.

*Example*

About 1.3 g. of the ethyl ester of 2-benzamido-3-hydroxy-propanoic acid (which can be prepared by reacting 2-amino-3-hydroxy-propanoic acid with benzoyl chloride in presence of an alkali, followed by esterification) is suspended in benzene, about 0.4 cc. of pyridine is added followed by approximately 0.6 cc. of thionyl chloride, and the mixture is heated on a steam bath for about 20 minutes, then cooled. It is washed with water, dilute hydrochloric acid, dilute sodium bicarbonate solution, again with water; the benzene is removed in vacuo and the residue is crystallized from ether and petroleum ether, yielding the product: ethyl ester of 2-benzamido-3-chloropropanoic acid (M. P. 90.5–91° C.). About 1.8 g. of this ester dissolved in a little alcohol is added to a solution formed by dissolving about .16 g. of sodium in absolute ethanol and adding 0.85 g. of ethyl thioglycolate, and the mixture is heated on a steam bath for about 20 minutes or until neutral (using litmus indicator), then it is filtered, the alcohol is removed in vacuo, the residue is taken up in ether, filtered, the ether is distilled and an oily residue is obtained comprising the diethyl ester of 2-benzamido-3-carboxymethylmercapto-propanoic acid. When treated with sodium ethoxide ring closure is effected and, upon decarboxylation by heating with an aqueous acid, 3-keto-4-benzamido-tetrahydrothiophene (intermediate 6 above) is obtained.

In like manner by using as starting materials the methyl or propyl esters of 2-benzamido-3-hydroxy-propanoic acid with ethyl thioglycolate corresponding mixed diesters can be obtained or if preferred corresponding esters of thioglycolic acid can be used to produce corresponding diesters having the same alkyl groups.

Modifications may be made in carrying out the present invention without departing from the spirit and scope thereof and the invention is to be limited only by the appended claims.

What is claimed is:

1. The process that comprises reacting under alkaline conditions a lower alkyl ester of thioglycolic acid with a lower alkyl ester of 2-benzamido-3-chloro-propanoic acid to form an ester of 2-benzamido-3-carboxymethylmercapto-propanoic acid.

2. The process that comprises reacting under alkaline conditions, the ethyl ester of 2-benzamido-3-chloro-propanoic acid with ethyl thioglycolate to produce the diethyl ester of 2-benzamido-3-carboxymethyl-mercapto-propanoic acid.

3. The process that comprises reacting ethyl-2-benzamido-3-chloro-propanoate with an S-alkali metal derivative of ethyl thioglycolate to produce diethyl-2-benzamido-3-carboxymethyl-mercapto-propanoate.

4. The process that comprises reacting ethyl-2-benzamido-3-chloro-propanoate with the S-sodium derivative of ethyl thioglycolate to produce diethyl-2-benzamido-3-carboxymethyl-mercapto propanoate.

STANTON A. HARRIS.
DOROTHEA HEYL.

(References on following page)

REFERENCES CITED

The following references are of record in the file of this patent:

Bergmann et al., "Zeit. Physiol. Chem.," vol. 140, pp. 128–145 (1924).

Karrer et al., "Helvetica Chim. Acta," vol. 9, 301–323 (1926).

Michaelis et al., "J. Biol. Chem.," vol. 106, pp. 331–341 (1934).

Karrer et al., "Helv. Chim. Acta," vol. 27, Mar. 15, 1944, pp. 237–239.

Karrer et al., "Helv. Chim. Acta," vol. 27, July 3, 1944, pp. 1281–1282.